United States Patent [19]

Yamakita

[11] 4,312,037
[45] Jan. 19, 1982

[54] ELECTRONIC CASH REGISTER WITH SINGLE PRINTER FOR PRINTING RECEIPTS AND A JOURNAL

[75] Inventor: Tooru Yamakita, Hamura, Japan

[73] Assignee: Casio Computer Co., Ltd., Tokyo, Japan

[21] Appl. No.: 102,391

[22] Filed: Dec. 11, 1979

[30] Foreign Application Priority Data

Dec. 18, 1978 [JP] Japan .............................. 53-154939
Dec. 26, 1978 [JP] Japan .............................. 53-162789

[51] Int. Cl.³ ............................................ G06F 15/20
[52] U.S. Cl. .................................. 364/405; 364/200
[58] Field of Search .............. 364/405, 404, 710, 200

[56] References Cited

U.S. PATENT DOCUMENTS

| | | | |
|---|---|---|---|
| 3,909,604 | 9/1975 | Monna | 364/404 |
| 4,186,439 | 1/1980 | Shimura et al. | 364/405 |
| 4,213,179 | 7/1980 | Hamano et al. | 364/405 |

*Primary Examiner*—David H. Malzahn
*Attorney, Agent, or Firm*—Frishauf, Holtz, Goodman & Woodward

[57] ABSTRACT

An electronic cash register provides printing data printed on a recording sheet in the form of a receipt or a journal. The electronic cash register is provided with a single printer to print printing data on a recording sheet to issue a receipt, and memory means for temporarily storing the printing data for a journal inputted with the receipt issuings. The printing data is read out from the memory means by operating a specified key and the read-out data is printed on a recording sheet to thereby issue a journal with the same single printer.

11 Claims, 7 Drawing Figures

ELECTRONIC CASH REGISTER WITH SINGLE PRINTER FOR PRINTING RECEIPTS AND A JOURNAL

BACKGROUND OF THE INVENTION

This invention relates to an electronic cash register which can print a receipt and a journal by means of a single printer.

A conventional register is provided with a printer used for printing a receipt and another printer for a journal sheet. In registering operations, the same data is simultaneously printed on the receipt and the journal. The receipt is torn off and handed to a customer while the journal is rolled around a reel to be used as a business record. The use of the two printers, however, makes the cash register body large in size and high in cost. Further, the printers simultaneously perform the printing operations, so that the impact of the hammers resonate to produce a noisy and uncomfortable sound. In setting the sheet for the receipt and the journal in the printers, the receipt sheet is inserted at one end into a receipt feeding port so that the receipt sheet is afterwards taken out from an issuing port. The journal sheet is hooked to or rolled around the shaft of a take-up reel so that the journal sheet is taken up by the take-up reel every time the printing operation is completed. For this, laborious work is required for the sheet settings. If a customer returns an item he bought in the shop and hands the receipt about the item to a cashier, the cashier checks the receipt to see if the item was indeed bought in the shop and if the receipt was indeed issued by her cash register. After the cashier confirms that the customer bought it from her shop, the cashier enters the piece of the returned goods into the cash register. In the item return operation, the judgement if the receipt of the returned item is issued by her shop or not depends solely on the judgement of the cashier. Therefore, there is a high possibility that she may make an erroneous judgement. In other words, the judgement is always unreliable. When the amount of the returned item is registered, the data already printed at the time of registering is not erased, but the amount of the returned item is newly printed on the journal. The printed journal is accordingly difficult to read and this hinders the effective management of sales amount.

Accordingly, an object of the invention is to provide a cash register which can print a receipt and a journal by a single printer.

Another object of the invention is to provide a cash register which is small in size, low in cost to manufacture, simple in the recording sheet setting work, and having a low impact sound of the hammer.

The invention is based on the nature of the journal as a business record in that it is usually used at the end of the business of the day.

SUMMARY OF THE INVENTION

One of the features of the invention resides in that, in the registering of data, the printing data is printed on a receipt while at the same time it is temporarily stored in a memory, and after the data registering ends, the contents of the memory are read out to print a journal.

Another feature of the invention resides in that, when usual sale data is registered, the data is printed as the data for the receipt and outputted while the data, together with the related consecutive number, is stored in a memory and, when the sales data for the journal is afterwards referred to, the related consecutive number is entered into the cash register to take out the sales data for the journal associated with the consecutive data.

DETAILED DESCRIPTION

Figure 1:
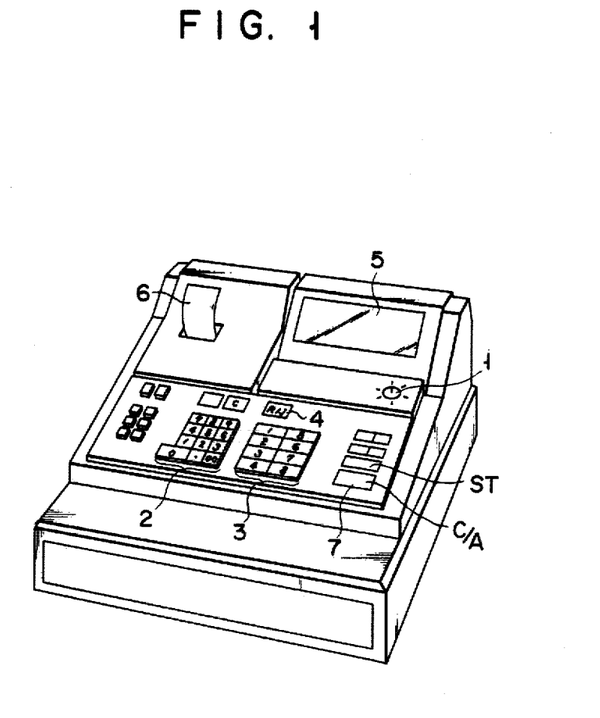
FIG. 1 is a perspective view of an electronic cash register according to the invention.

FIG. 1 shows an embodiment of an electronic cash register. In the figure, reference numeral 1 designates a control lock for specifying a mode such as off, registering, refund, read operation, or reset operation mode; reference numeral 2 an amount key used for registering an amount; reference numeral 3 a department key for separately registering respective groups of goods, respective counters and the like; reference numeral 4 a receipt identifying/journal preparation key which is used in judging if, when goods once bought is returned to the shop by a customer, the receipt returned with the associated goods was issued or not by the cash register through which the returned goods was sold to the customer, and which is used when the printing of the journal starts after the printing of the data to be printed on a receipt ends; reference numeral 5 a display section; reference numeral 6 a recording sheet or a paper for a receipt or a journal; reference numeral 7 a cash/amount tender key to specify a cash sale, to calculate change and to issue an amount tender.

Figure 2:
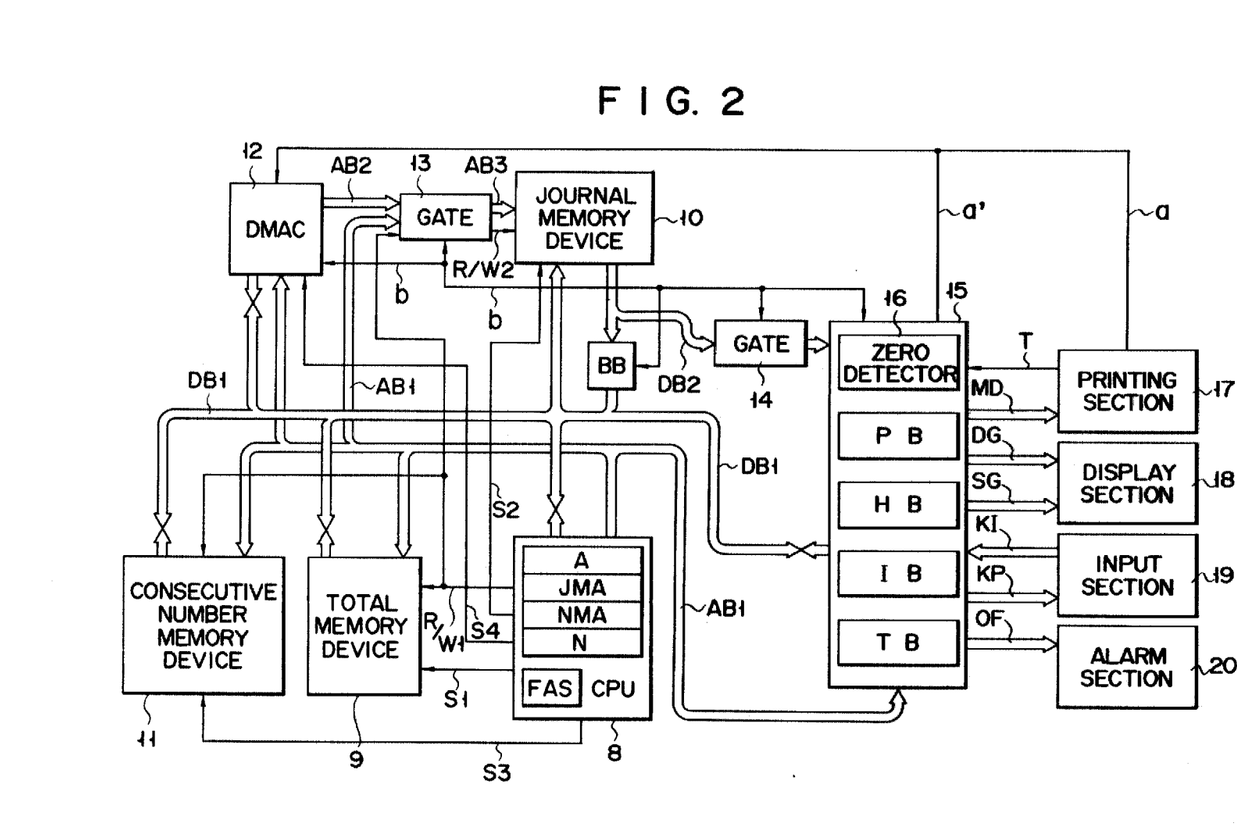
FIG. 2 is a circuit diagram of the cash register shown in FIG. 1.

FIG. 2 illustrates a system block diagram of the electronic cash register. In the figure, a control processing unit (CPU) 8 has an arithmetic logic portion FAS and an accumulator for performing arithmetic operations, address registers JMA and NMA, and a consecutive number register N for storing a consecutive number. The CPU 8 controls the arithmetic operations, temporary storage of data and data transfer. The CPU 8 is connected through a data bus line DB1 with a total memory device 9, a journal memory device 10, a consecutive number memory device 11, and a DMAC (direct memory access controller) 12. It is further connected through an address bus line AB1 with the total memory device 9, the consecutive number memory device 11, the DMAC 12 and one input terminal of a gate 13. Coupled with the other input terminal of the gate 13 through an address bus line AB2 is an address value from the DMAC 12. The address value selected by the gate 13 is coupled with the journal memory device through an address bus line AB3. To the total memory device 9, the journal memory device 10, the consecutive number memory device 11, and the DMAC 12 are respectively coupled with chip designating lines $S_1$ to $S_4$ to which chip selecting signals derived from the CPU 8 are transferred. A read/write signal R/W1 derived from the CPU 8 is applied to the total memory device 9 and the consecutive number memory device 11. The R/W1 is also applied as a R/W2 signal to the journal memory 10 through the gate 13. Data read out from the journal memory device 10 is written into the CPU 8 through a bus buffer BB. In this manner, the CPU 8 receives data from, and transfers the data to, the total memory device, the journal memory device 10, the consecutive number memory device 11, and the DMAC 12.

The CPU 8 is connected to an I/O port 15 through the data bus line DB1 and the address bus line AB1. The I/O port 15 includes a printing buffer PB, a display buffer HB, an input buffer IB, a state buffer TB, and a zero detector 16 to be described later. The printing buffer PB is connected to a printing section 17; the display buffer HB to a display section 18; the input buffer IB to an input section 19; the state buffer TB to an alarm section 20 such as a buzzer. The printing section 17 prints data on the recording sheet shown in FIG. 1 by a single line printer (not shown) and issues a receipt in a usual registering operation mode. After the usual registering operation ends, the printer 17 issues a journal through a specific operation. The printing section 17 transfers a print position signal T for a print drum (not shown) to the I/O port 15. The I/O port 15 transfers to the printing section 17 a print drive signal MD which is produced when the print position signal T is coincident with the data in a print buffer PB within the I/O port 15. Receiving the print drive signal MD, the print section 17 drives a given hammer to effect a print operation. In accordance with a timing signal KP applied from the I/O port 15 when a key is operated, the input section 19 inputs a key input signal KI to an input buffer IB within the I/O port 15. The display section 18 performs a display operation in accordance with a digit signal DG of the I/O port 15 and a segment signal SG obtained by decoding data within the display buffer HB. The alarm section 20 performs an alarm operation in accordance with an overflow signal from a state buffer TB. The data read out from the journal memory 10 is inputted to the print buffer PB through the data bus line DB1 and the gate circuit 14.

Figure 3:
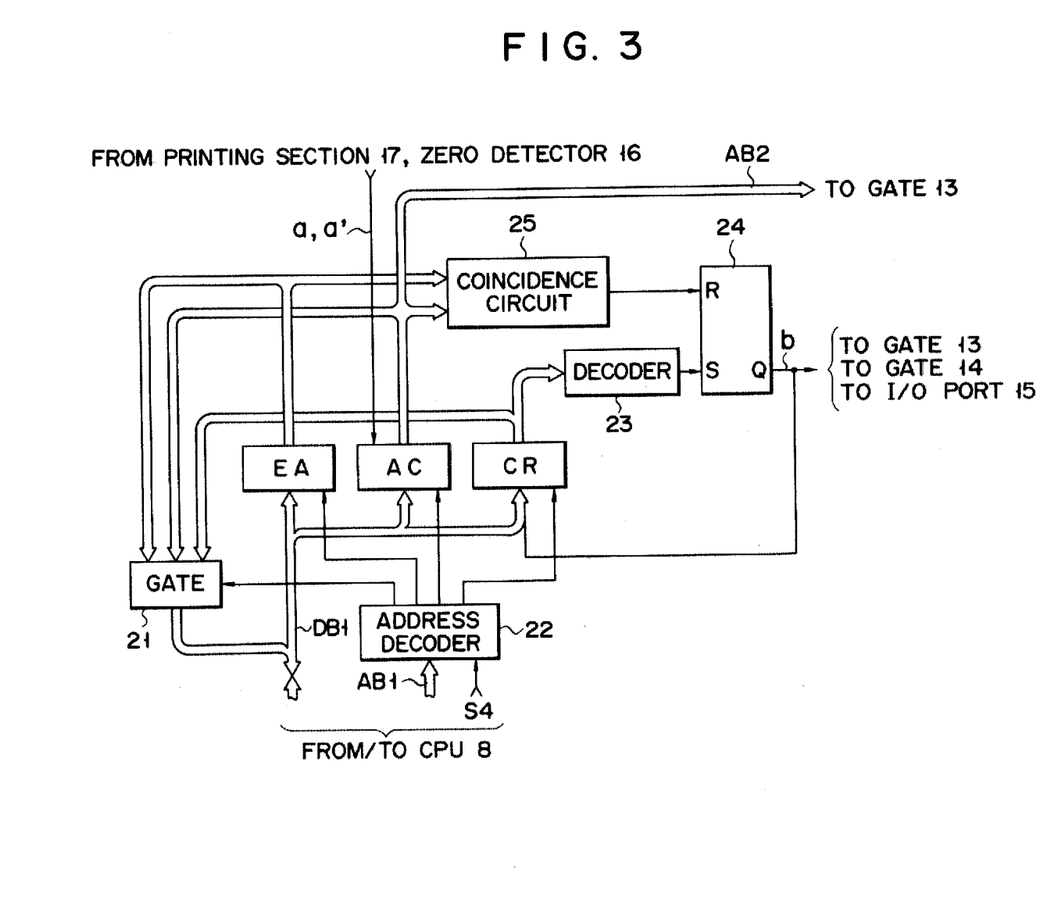
FIG. 3 is a circuit diagram of a DMAC of the cash register shown in FIG. 1.

Turning now to FIG. 3, there is shown a circuit construction illustrating the detail of the DMAC 12. The data supplied through the data bus line DB1 from the CPU 8 is applied to an end address register EA, an address counter AC and a control register CR. The output data from the register EA, the counter AC, and the register CR are applied to a gate circuit 21. The output data selected by the gate circuit 21 is applied through a data bus line DB1 to the CPU 8. An address signal supplied through an address bus line AB1 from the CPU 8, together with a chip designating signal S4, is applied to the address decoder 22 which designates one of the register EA, the counter AC or the register CR in accordance with the address signal. A print start signal from the CPU 8 is applied to the control register CR through the data bus line DB1. Upon receipt of it, the register transfers it to a decoder 23 which in turn decodes it to set a flip-flop 24. The address counter AC is counted up in accordance with a count-up signal a outputted from the printing section 17 every time a line of data is printed on the recording sheet by the printing section 17; it is also counted up according to a count-up signal a' outputted from the zero detector 16 when it detects zero of the data in the print buffer PB. If a called zero-data skipping circuit in which, with the provision of the zero detector 16, zero data unnecessary for the journal is skipped, is employed, the amount of the recording sheet may be saved. The contents of the counter AC is applied as an address signal for the journal memory device 10 through the gate 13 and also to a coincidence circuit 25. The end address register EA stores an end address representing a memory capacity of the journal memory device 10. The end address is also applied to the coincidence circuit 25. When contents of the counter AC are coincident with that of the register EA, the coincidence circuit produces the detecting signal to reset the flip-flop 24. A set signal from the flip-flop 24 is applied to the control register CR. The CPU 8 accesses the set signal from the control register CR through the gate circuit 21 to judge if the flip-flop 24 is in set state or not. At this time, if it judges the flip-flop is in set state, it knows that the DMAC 12 is in an output mode.

The set signal for the flip-flop 24 is inputted from the DMAC 12 as a journal print designation signal b is applied to the gate 13, the gate circuit 14, and the I/O port 15. According to the print designation signal b, the gate 13 selectively produces either of the address signal from the CPU 8 and the DMAC 12. When the print designation signal b is absent at the input of the gate 13, the gate 13 permits the address signal from the CPU 8 to pass therethrough while, when it is present, it permits the passing therethrough of the signal from the DMAC 12. Further, when not receiving the signal b, the gate 13 produces as the signal R/W1, while, when receiving it, the gate 13 blocks the signal R/W1 but produces the read designation signal from itself as a signal R/W2. When receiving the print designation signal b, the bus buffer BB exhibits a high impedance at the output to separate it from the data bus line DB1. When receiving the signal b, the gate circuit 14 produces data from the journal memory device 10. The I/O port 15 is designed that, when receiving the signal b, it addresses only the print buffer PB but, when not receiving the signal, it addresses the print buffer PB, the display buffer HB and the like by an addressing signal from the CPU 8.

The total memory device 9 has a storage area for storing the department sale total, the transaction sale total, the clerk sale total, and the like. The journal memory device 10 sequentially stores the respective sales data in the registering order. The consecutive number memory device 11 stores the address value of the heads of the sales data of individual customers stored in the journal memory device 10.

Figure 4:
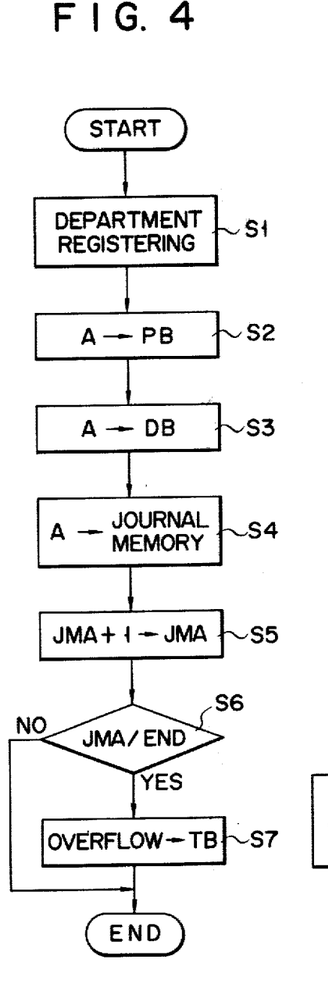
FIGS. 4 to 7 are a flow chart showing how the cash register of FIG. 1 is operated.
Figure 5:
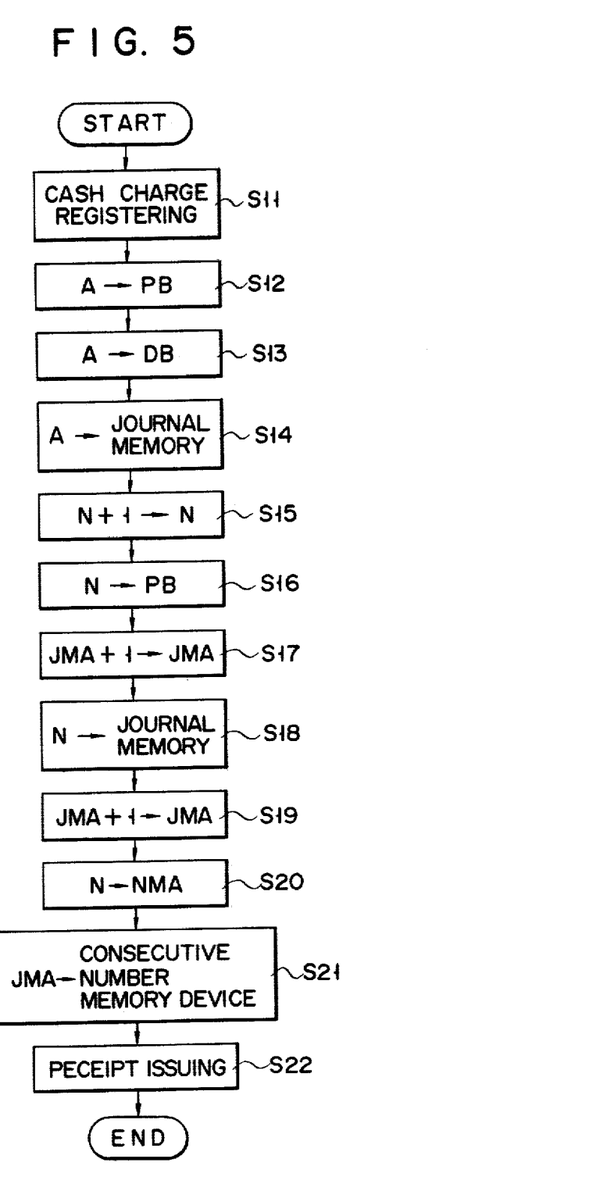

The operation of the cash register with such a construction will be described with reference to flow charts shown in FIGS. 4 to 6. FIG. 4 is a flow chart useful in explaining a department registering. In performing a usual department registering, a control lock 1 is first switched to set to a "register" mode. By the way, the receipt identifying/journal preparing key 4 is not operated in the register mode but operated when the registering work of the day is finished or when a customer asks a cashier to take back the goods once sold. Accordingly, the flip-flop 24 in the DMAC 12 is in a reset state and in the registering mode, and therefore no print designation signal b is being produced from the DMAC 12. In such a condition, sales data is entered by operating the amount key 2. Following this, a department designation code is inputted by operating the department key 3. Through this key operation, a step S1 shown in FIG. 4 is executed to perform the department registering process. To be more specific, by operating the amount key, sales data is inputted into the input buffer IB in the I/O port 15 which in turn applies the data to the accumulator A in the CPU 8. Then, by operating a department key 3, the sales data is added within the CPU 8 to the department sales data having been stored in the total memory device 9, and the addition result is transferred to the total memory device 9 to be stored therein. In the next step S2, sales data is read out from the accumulator A in the CPU 8 to be applied to the print buffer PB. Subsequently, signals T and MD are transferred between the I/O port 15 and the printing section 17. A printer of the section 17 is driven to print sales data and a department numerical code on the recording sheet 6 as a receipt. Further, in a step S3, sales data stored in the accumulator A of the CPU 8 is applied to the display buffer HB of the I/O port 15. The contents of the display buffer HB is transferred to the display section 18 to be displayed. In a step S4, sales data stored in the accumulator A in the CPU is transferred to the journal memory device 10. At this time, since the print designation signal b is not applied to the gate 13, a journal memory address outputted from an address register JMA of the CPU 8 is applied through the gate 13 to the journal memory device 10. Therefore, the journal memory device 10 writes sales data into the address thereof specified by the address. In the following step S5, an address value in a address register JMA is added to +1 in order to specify the next address within the CPU 8. The CPU 8 then waits for the next data to come in. In this manner, sales data are sequentially written into the journal memory device 10 till the sales data amount to the memory capacity of the device 10. In a step S6, a judgement is made if the address value within the address register JMA has reached the storage capacity of the memory 10 or not. If it reaches the memory capacity and YES is provided, the next step S7 is executed. In this step, the CPU 8 delivers a signal designating an overflow to the I/O port 15 and is applied into the state buffer TB. Then, the buffer TB transfers it as an overflow signal OF to the alarm section 20. The overflow signal OF applied drives the alarm section 20 to produce an alarm. If result of the judgement of the step S6 is NO, the address value does not yet reach the memory capacity of the memory 10. Accordingly, there is no need for sounding an alarm, so that the step S7 is skipped. At this point, the processing in the department registering ends.

The operation when the sale data of one customer is registered, and the register keys such as the amount key 7, the charge key and the like are depressed, will be described with reference to a flow chart shown in FIG. 5. Firstly, in a step S11, when the cash key 7 is operated, the subtotal amount is loaded into the accumulator A of the CPU 8. When the charge key is operated, the charge total amount is loaded into the accumulator A of the CPU 8 where the cash or the charge is registered. In the next step S12, the contents of the accumulator A are transferred to the print buffer PB of the I/O port 15. The contents of the accumulator A are transferred to the display buffer HB of the I/O port 15 in a step S13. As a result, the contents of the accumulator A are printed as the receipt print data by the print section 17 while at the same time is displayed by the display section 18. In the next step S14, the contents of the accumulator A of the CPU 8 are a given memory location of the journal memory 10, that is, the memory location specified by the address signal supplied through the gate 13 from the address register JMA within the CPU 8. Then, within the CPU 8, the contents of the consecutive register N for storing a consecutive number of the receipt are incremented by one, (+1). In this way, the next step S15 is performed. This receipt consecutive number obtained by the step S15 is transferred to the print buffer PB of the I/O port 15 in a step S16 and it is printed as the receipt data in the print section 17. In the next step S17, an operation to increment the address value of the address register JMA by one (+1) is performed. The result of the operation is written into the address register JMA for the journal memory, again. The program execution shifts to the next step S18. In this step, the receipt consecutive number obtained in the step S15 is written into the given memory location of the journal memory 10 specified by the address JMA obtained by the step S16. In the next step S19, an operation to increment the address value in the address register JMA by one (+1), again. The memory locations of this address and the succeeding ones are used to store the sales data of the next customers. In the next step S20, the data in the consecutive number register N is transferred to the address register NMA to specify the consecutive number memory 11. The next step S21 loads the address value of the address register JMA obtained through the process in the step S19 into the given memory location specified by the address value within the address register NMA. This address value is the first address value of the sales data loaded into the journal memory 10 when the registering of the next customer is performed. A step S22 prints the data, stamp, and the like, and issues the receipt. As described above, the process shown by the flow of FIG. 4 is performed every operation of the department key after the amount data is entered. The sales data is printed on the receipt while at the same time is stored into the journal memory 10. When the receipt issuing key such as the cash key is operated, the process shown by the flow of FIG. 5 is performed, and the value of the first address of the journal memory 10 in which the sales data of the next customer is stored into the consecutive memory 11.

Figure 6:
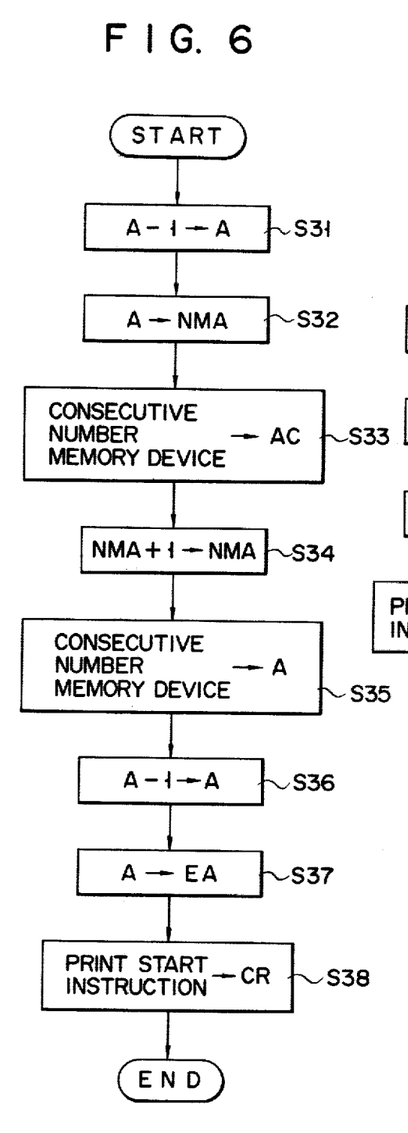

FIG. 6 is a flow chart showing the goods returning process. This process is performed by operating a receipt identifying/journal preparing key 4 after a consecutive number printed on a receipt of an article returned to the shop by a customer is entered to the cash register by operating the amount key 2. More specifically, after the control lock 1 is set to a return mode, the consecutive number is entered by the amount key 2. As a result, the consecutive number is inputted to the input buffer IB in the I/O port 15, which then applies it to the accumulator A in the CPU 8. Following this, with the key 4 operated, the contents of the accumulator A in the CPU 8 are decremented by one (−1) as shown in a step S31 of FIG. 6. And in the next step S32, the contents of the accumulator A are transferred to the address register NMA of the consecutive number memory device 11 within the CPU 8. In the step S33 following the step S32, the data in the memory device 11 specified by the address register NMA is read out and applied to the accumulator A and then transferred to the address counter AC of the DMAC 12. The data value applied to the address counter AC represents an address in the journal memory device 10 designated by the consecutive number where the first sales data is stored. In the next step S34, the CPU 8 counts up the address value in the address register NMA. In a step S35, the data is read out from the memory location of the memory device 11 and loaded into the accumulator A. Then, a step S36 decrements the data by one (−1). This address value represents an address of the memory location of the journal memory device 10 where the last sales data is stored. The value is transferred to the end address EA in the DMAC 12. Accordingly, the first address value representing the memory location of the journal memory device 11 in which the sales data of the returned goods receipt has been stored, is held in the address counter AC of the DMAC 12. On the other hand, the last address value is stored in the end address EA of the DMAC 12. Under this condition, in a step S38, the CPU 8 applies a print start command through the data bus line DB to the control register CR.

Upon receipt of the command, the control register CR sets the flip-flop 24 through the decoder 23. The set signal is outputted from the DMAC 12 as a print designation signal b. After the signal b is outputted, the value of the address counter AC of the DMAC 12 serves as the signal representing an address in the journal memory device 10 and is applied through the gate 13 to the memory device 10. At this time, the journal memory device 10 receives a read/write signal R/W2 and the data is read out from the memory location addressed of the memory device 10. The read-out data is applied through the gate circuit 14 to the print buffer PB in the I/O port 15. At this time, the zero detector 16 judges if the contents of the print buffer PB are zero or not. When it is zero, the contents of the address counter AC are incremented by one (+1), so that the next address is specified. When it is not zero, the contents are printed by the printer in the print section 17. With the printing operation performed, the contents of the address counter AC in the DMAC 11 are incremented by one (+1), to specify the next address. In this way, the contents of the journal memory device 10 are sequentially read out in response to the addressing by the DMAC 12 and are printed by the printer. The DMAC 12 detects a coincidence of contents of the address counter AC with that of the end address register EA and resets the flip-flop 24 to stop the supply of the print designation signal b. With the stop of the signal supply, the printing operation relating to the journal memory device 10 ends, and a journal may be torn off from a receipt issuing port.

In brief, for handling the returned goods, all the operator has to do are to verify the receipt brought by the customer with relation to the journal printed and issued as described above. If it is so done, he can easily judge if the receipt of the returned goods is issued by his shop or not. In erasing the sales data of the returned goods among those sales data in the journal memory device 10, the following three steps S31 to S33 are taken as shown in the flow chart of FIG. 6,. First, a consecutive number is entered the cash register and an address value in the journal memory device 10 corresponding to the consecutive number is read out from the consecutive number memory device 11 to be applied to the register in the CPU 8. Further, sales data in the memory location of the journal memory device 10 specified by an address value in the register, is read out and transferred to the display buffer HB. Then, an operator visually judges if the sale data displayed by the display section is coincident with the amount of the data of the goods returned by a customer. If those are not coincident, the read key is operated to count up an address value in the register. The next sale data in the journal memory device 10 is read out to be displayed. After this, every key operation the sale data is read out to be applied to the display buffer HB. After seeing that the returned goods is read out, the operator operates to erase or to delete the data from the journal memory 10. At this time, the amount corresponding to the sales data is also deleted from the total department sale data, the total transaction sale data, and the total clerk sale data. When a customer asks the operator to take back the goods for exchanging it with a new one, new data is written into the memory after the erasing mentioned above.

Figure 7:
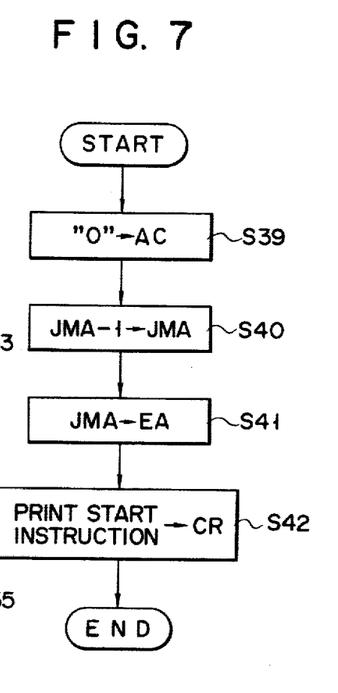

When a day's work ends all the data in the journal memory 10 are printed to prepare. To prepare a journal, the cash register is operated as being described with reference to FIG. 7. Firstly, the control lock 1 is set to the register mode, and the receipt identifying/journal preparation key 4 is operated. After this operation, "0" is transferred from the CPU 8 to an address counter AC in the DMAC 12. Then the address counter AC is cleared. See a step S39. In the next step S40, the address value in the address register JMA is decremented by one. The address value is written into the end register EA in the DMAC 12 in a step S41. The value represents the final address of the sales data stored in the journal memory 10. In a step S42, the print start command is loaded into the control register CR. The print start command loaded is detected by the decoder 23 and to set the flip-flop 24. As described above, all the data in the journal memory 10 are sequentially printed on a recording sheet 6 by the printer 17 under control of the DMC 12. While, in the above mentioned embodiment, the individual sales data is printed on a recording sheet for each registering operation and at the same time are stored into the journal memory 10, only the data necessary as the journal such as department data specified, the transaction data specified, and the subtotal data of the customer data, may selectively be stored in the journal memory 10. The selecting means to select the data may be realized through the designation by a switch or a plug provided corresponding to each key. In the case of the designation by the plug, the control lock 1 is first set to the preset mode, and then the department key 3, the transaction key, and the subtotal key, of which the data are desired to be stored in the journal memory 10, are operated. Through this operation, a flag is stored in a register in the CPU 8 corresponding to a key code. Then, the control lock 1 is set to the register mode. By the setting of the control lock 1, the CPU 8 judges if the flag corresponding to the key operated is set in said register or not. If it is set therein, only the sales data corresponding to the flag set is transferred to the journal memory 10. Alternatively, the journal memory, which is incorporated into the cash register in the above-mentioned embodiment, may be provided separately from the cash register and, in use, is coupled with or plugged into the cash register. When a journal memory is used coupled with the cash register, and the data are stored up to the memory capacity of the journal memory, the journal memory filled up with the data is replaced by another new one and is kept for future use. This modification is very useful when there are several days between the date that the goods is sold and the date that it is returned. Furthermore, a protective power source may additionally be used for protecting the data stored in the journal memory circuit from being destroyed when a power stoppage takes place.

The total memory device and the consecutive number memory device may be formed in a single memory, although they are separate used in the above-mentioned embodiment.

It will be understood by those skilled in the art that the foregoing and the other changes can be made therein without departing from the spirit and scope of the invention.

As seen from the foregoing description, a single printer can be used for issuing both the receipt and the journal. Because of the use of the single printer, the cash register may be made small in size and lower in cost as compared to the conventional cash register. Further, the impact sounds of the prior art pair of printers, which is noisy and uncomfortable for customers, is reduced. Additionally, the recording sheet for the journal is not needed in addition to that for the receipt, so that there is no need for setting work to set the journal sheet, resulting in improvement of the operability of the cash register.

Furthermore, in the cash register according to the invention, the receipt and the journal may be verified, so that an operator can correctly judge if the returned goods is the one sold by his shop or not. With respect to the handling of the returned goods, the cash register may be so modified that after the journal to verify it with receipt is issued, the data of the returned amount is deleted from the memory device. By this modification, the journal used as a business record after the registering work is completed is neat and easy to see.

What is claimed is:

1. An electronic cash register which can successively write and read sales data, comprising:
   input means including a data input key for keying in sales data and a journal operation key for indicating a journal preparation;
   sales data memory means coupled to said input means for storing successively sales data keyed in by operation of said data input key;
   sales data processing means coupled to said input means for classifying sales data keyed in by operation of said data input key into one of a plurality of classifications, and adding together sales data of each classification;
   sum memory means coupled to said sales data processing means for storing the sum of the sales data of each classification;
   sales data reading means coupled to said sales data memory means for reading successively the sales data from said sales data memory means when said journal operation key is operated; and
   a single printer coupled to said sales data reading means for printing sales data whenever the sales data are keyed in by operation of said data input key and for printing successively the sales data read from said sales data memory means by said sales data reading means when said journal operation key is operated.

2. An electronic cash register according to claim 1, wherein said input means further includes means for designating a classification of sales data; and said sales data memory means stores only sales data of the classification designated by said data classification designating means.

3. An electronic cash register according to claim 1, further comprising consecutive number storing means coupled to said sales data processing means for storing a consecutive number counted up at the issuing of every receipt; and wherein said sales data processing means includes means for searching a consecutive number within said consecutive number keyed in, when the consecutive number is keyed in by said input means, said printer printing the sales data in said sales data memory means corresponding to the consecutive number searched.

4. An electronic cash register according to claim 2 or 3, further comprising display means coupled to said sales data processing means for displaying the sales data read out from said sales data memory means by said sales data processing means; and wherein said input means includes a read key to specify one of the sales data in said sales data memory means and to read out the specified one, and said sales data processing means includes means for transferring one read out data in said sales data memory means to said display means every time said read key is operated.

5. An electronic cash register according to claim 4, wherein said input means includes a delete key to delete one of the sales data in said sales data memory means; and said sales data processing means includes means for deleting one sales data in said sales data memory means specified by said read key when said delete key is operated.

6. An electronic cash register according to claim 4, wherein said sales data memory means has memory areas, and said sales data processing means includes means for writing a new sales data into a memory area of said sales data memory means after a sales data has been read out of the same memory area and printed.

7. An electronic cash register according to claim 1, further comprising alarm means coupled to said sales data processing means; and wherein said sales data memory means has memory areas, and said sales data processing means includes means for detecting that said memory areas of sales data memory means are all filled up with sales data and for then driving said alarm means.

8. An electronic cash register according to claim 1, wherein said sales data memory means is removable from said cash register.

9. An electronic cash register according to claim 1, wherein said sum memory means has memory areas for storing the total data such as department sales data, transaction sales data, and clerk sales data.

10. An electronic cash register according to claim 1, further comprising a direct memory access controller coupled to said sales data memory means to sequentially designate the sales data in said sales data memory means and to produce the specified one of said sales data sequentially.

11. An electronic cash register according to claim 10, wherein said direct memory access controller includes an address counter for storing the head address of the sales data to be outputted of those sales data in said sales data memory means, and an end register for storing the final address of the sales data.

* * * * *